United States Patent
Hasegawa

(10) Patent No.: US 11,248,733 B2
(45) Date of Patent: Feb. 15, 2022

(54) METHOD FOR LINKING SEGMENTS FOR REHABILITATION PIPE AND LINKING TOOL

(71) Applicant: SHONAN GOSEI-JUSHI SEISAKUSHO K.K., Kanagawa (JP)

(72) Inventor: Takeshi Hasegawa, Kanagawa (JP)

(73) Assignee: Shonan Gosei-Jushi Seisakusho K.K., Kanagawa (JP)

( * ) Notice: Subject to any disclaimer, the term of this patent is extended or adjusted under 35 U.S.C. 154(b) by 0 days.

(21) Appl. No.: 16/927,211

(22) Filed: Jul. 13, 2020

(65) Prior Publication Data
US 2021/0025532 A1   Jan. 28, 2021

(30) Foreign Application Priority Data
Jul. 24, 2019   (KR) .......................... 10-2019-0089288

(51) Int. Cl.
*F16L 55/18*   (2006.01)
*F16L 55/16*   (2006.01)

(52) U.S. Cl.
CPC ............... *F16L 55/18* (2013.01); *F16L 55/16* (2013.01)

(58) Field of Classification Search
CPC .................................. F16L 55/18; F16L 55/16
USPC ................... 138/97, 98; 405/151, 153, 184.2
See application file for complete search history.

(56) References Cited

U.S. PATENT DOCUMENTS

| | | | | |
|---|---|---|---|---|
| 2,084,952 | A * | 6/1937 | Field | B21D 39/03 220/243 |
| 4,477,204 | A * | 10/1984 | Rohde | E21D 11/083 405/153 |
| 6,616,377 | B1 * | 9/2003 | Smith | E21D 11/083 405/135 |
| 7,341,280 | B2 * | 3/2008 | Kamiyama | E03F 3/06 285/15 |
| 8,240,339 | B2 * | 8/2012 | Kamiyama | F16L 55/163 138/98 |
| 8,360,684 | B2 * | 1/2013 | Kamiyama | F16L 55/1657 405/135 |
| 9,797,539 | B1 * | 10/2017 | Kamiyama | F16L 55/1657 |
| 2010/0101674 | A1 | 4/2010 | Kamiyama | |

(Continued)

FOREIGN PATENT DOCUMENTS

JP   2010101390 A1   5/2010
JP   2011012803 A1   1/2011
(Continued)

*Primary Examiner* — James F Hook
(74) *Attorney, Agent, or Firm* — Moser Taboada

(57) ABSTRACT

A linking pin made of elastic plastic having linking pin halves is used to link segments in the longitudinal direction to assemble a rehabilitation pipe. The linking pin includes a tubular portion having on its outer periphery surface first and second protrusions separated by a distance of twice the thickness of the side plate of the segment and a rear protruding portion that enlarges in diameter due to elasticity. The linking pin is inserted into one segment and the other segment so that the side plates of both the segments come between the first and second protrusions. The linking pin is then enlarged in diameter due to elasticity to fit the side plates between the first and second protrusions and link both the segments in the longitudinal direction. The linking pin that is enlarged in diameter can be reduced in diameter to unlink both the segments.

6 Claims, 12 Drawing Sheets

(56) References Cited

U.S. PATENT DOCUMENTS

2010/0307624 A1  12/2010  Kamiyama et al.
2021/0041050 A1* 2/2021  Kamiyama ............. F16B 7/182

FOREIGN PATENT DOCUMENTS

KR      19990010338 A   2/1999
KR      20100045370 A   5/2010

* cited by examiner

METHOD FOR LINKING SEGMENTS FOR REHABILITATION PIPE AND LINKING TOOL

CROSS-REFERENCE TO RELATED APPLICATION

The present application is based on priority claimed on Korean Patent Application No. 10-2019-0089288, filed on Jul. 24, 2019, the contents of which are incorporated herein by reference.

TECHNICAL FIELD

The present invention relates to a method for linking segments in the longitudinal direction to assemble a rehabilitation pipe, the segment being formed by integrally molding an inner surface plate constituting an inner circumferential surface, side plates that have insertion holes and are provided upright on both sides extending in the circumferential direction of the inner surface plate, and inner plates between the side plates having insertion holes each smaller in diameter than those of the side plates. The present invention also relates to a linking tool used in this method.

BACKGROUND ART

In cases where pipelines such as sewage pipes buried underground have aged, rehabilitation methods have already been proposed which use segments each comprising an inner surface plate and outer wall plates provided upright on peripheral edges thereof, wherein the inner surface plate and the outer wall plates are integrally formed from a plastic material and the segments are linked in the circumferential and longitudinal directions to rehabilitate the pipelines.

In the rehabilitation method, nuts are fixed to one segment and long bolts are inserted in the longitudinal direction and screwed into the nuts from the other to link both the segments in the longitudinal direction (Patent Document 1 below).

A linking method has also been proposed (Patent Document 2 below) in which a linking pin comprising two pin halves attached to one segment is separated by a separating pin for fixation thereto and the other segment is fitted into the linking pin to link both the segments in the longitudinal direction.

Prior Art Documents

Patent Documents

Patent Document 1: JP 2011-12803 A
Patent Document 2: JP 2010-101390 A

SUMMARY OF INVENTION

Problems to be Solved

In the linking method as described in Patent Document 2, the linking pin is small-sized, and it is advantageous that the linking pin is fixed at one end to one segment and the other segment is simply snap fitted to the other end of the linking pin to firmly link both the segments. However, the linking pin is configured so as to prevent the other segment from moving backwards. Therefore, once the other segment is snapped to the linking pin, it becomes difficult to separate both the segments, making it impossible to unlink the segments in the longitudinal direction. Therefore, in cases where the attachment position of the linking pin is erroneous or incorrect, there is a problem that the longitudinal link of the segments cannot be performed again.

It is therefore an object of the present invention to solve such problems and provide a method for linking segments for a rehabilitation pipe and a linking tool being capable of easily linking or unlinking the segments in the longitudinal direction using a linking pin.

Means for Solving the Problems

The present invention provides a method for linking segments in the longitudinal direction to assemble a rehabilitation pipe, the segment being formed by integrally molding an inner surface plate constituting an inner circumferential surface, side plates that have insertion holes and are provided upright on both sides extending in the circumferential direction of the inner surface plate, and inner plates between the side plates having insertion holes each smaller in diameter than those of the side plates. In the method, a linking pin is prepared which is made of elastic plastic having linking pin halves symmetrically connected via a connecting portion and capable of being folded back and overlapped with each other. When the linking pin halves are overlapped with each other, the linking pin is provided with a front protruding portion capable of passing through the insertion hole of the inner plate, a tubular portion having on its outer periphery surface first and second protrusions that are separated by a distance of twice the thickness of the side plate of the segment and can pass through the insertion hole of the side plate, and a rear protruding portion that enlarges in diameter due to elasticity. The front protruding portion of the linking pin is inserted into the insertion hole of the inner plate of one segment and the tubular portion into the insertion hole of the side plate thereof. The tubular portion of the linking pin is inserted into the other segment to position the side plates of the one and other segments between the first and second protrusions thereof. The linking pin is then enlarged in diameter due to elasticity to fit the side plates of both the segments between the first and second protrusions, thereby linking both the segments in the longitudinal direction without separating the connecting portion of the linking pin. The linking pin that is enlarged in diameter is reduced in diameter to unlink both the segments that are fixed between the first and second protrusions of the linking pin. The present invention also provides a linking tool that is used for the above-described method.

Effect of the Invention

According to the present invention, it is possible to easily link the segments in the longitudinal direction by enlarging the diameter of the linking pin comprised of the pin halves, and easily unlink them by reducing the diameter thereof. Therefore, even if there is a mistake in linking the segments, the linking work can be performed again. This provides an excellent effect that the construction period can be shortened and the burden on the worker can be reduced.

MODE OF CARRYING OUT THE INVENTION

The present invention will now be described below based on embodiments shown in the attached drawings. The present invention is suitable for use in linking segments which are used to rehabilitate a large-diameter existing pipe such as a sewer pipe, a water pipe, a tunnel, an agricultural water pipe and the like.

Figure 1:
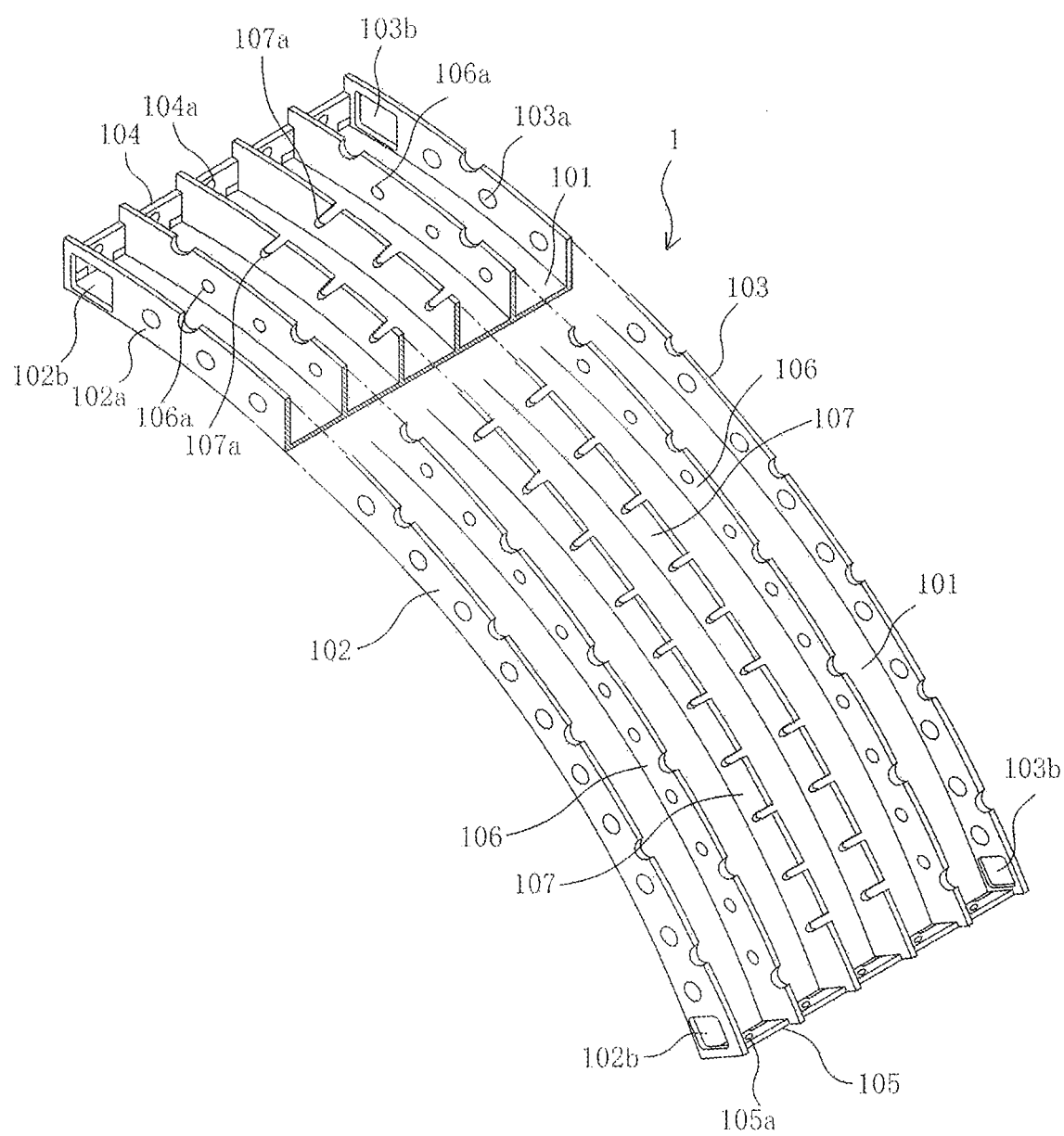
FIG. 1 is a perspective view showing the structure of a segment used to assemble a rehabilitation pipe.

FIG. 1 shows the structure of a segment 1 for a rehabilitation pipe (hereafter simply referred to as "segment"). The segment 1 is an integrally formed block-shaped member made from a plastic material, comprising an inner surface plate 101 constituting an inner circumferential surface of the rehabilitation pipe, side plates 102, 103 with the same shape provided upright on both sides extending in the circumferential direction of the inner surface plate 101, and end plates 104, 105 with the same shape provided upright on both ends extending in the longitudinal direction of the inner surface plate 101.

In the present embodiment, the segment 1 has a shape curved in an arc shape of a predetermined angle that divides the circumference into a plurality of equal parts, for example, 60 degrees that divides into six equal parts. However, the segment is not limited to an arc shape or a fan shape, and may be a rectangular parallelepiped or a shape bent at a right angle depending on the cross-sectional shape of the existing pipe, its size, or the location of the existing pipe to be repaired.

In order to reinforce the mechanical strength of the segment 1, a plurality of inner plates, four inner plates 106, 107 in the embodiment, having the same shape as the side plates are provided upright on the upper surface of the inner surface plate 101 between the side plates 102, 103 in parallel therewith at equal intervals. The side plates 102, 103 and the inner plates 106, 107 have the same plate thickness in the longitudinal direction.

In order to link the segment 1 in the longitudinal direction, a plurality of circular insertion holes 102a, 103a having the same diameter through which a linking member can pass are provided in the side plates 102, 103 at equal intervals in the circumferential direction. A plurality of circular insertion holes 106a having the same diameter smaller than the insertion holes 102a, 103a are also provided at equal intervals in the inner plates 106. A plurality of notches 107a through which the linking member can pass are provided at equal intervals in the inner plates 107. The insertion holes 102a, 103a, 106a and the notches 107a are located at coinciding positions in the circumferential direction such that the linking member can pass therethrough. The linking member is a linking pin or a linking bolt, as described later.

The end plates 104, 105 are disposed between the side plate 102 and the side plate 103. Provided on the end plates 104, 105 are a plurality of circular insertion holes 104a, 105a through which a linking member such as a bolt passes to link the segments in the circumferential direction.

The inner surface plate 101, the side plates 102 and 103, the end plates 104 and 105, and the inner plates 106 and 107 are all made of the same transparent, semitransparent, or opaque plastic, and are integrally molded using a known molding technique.

Figure 2:
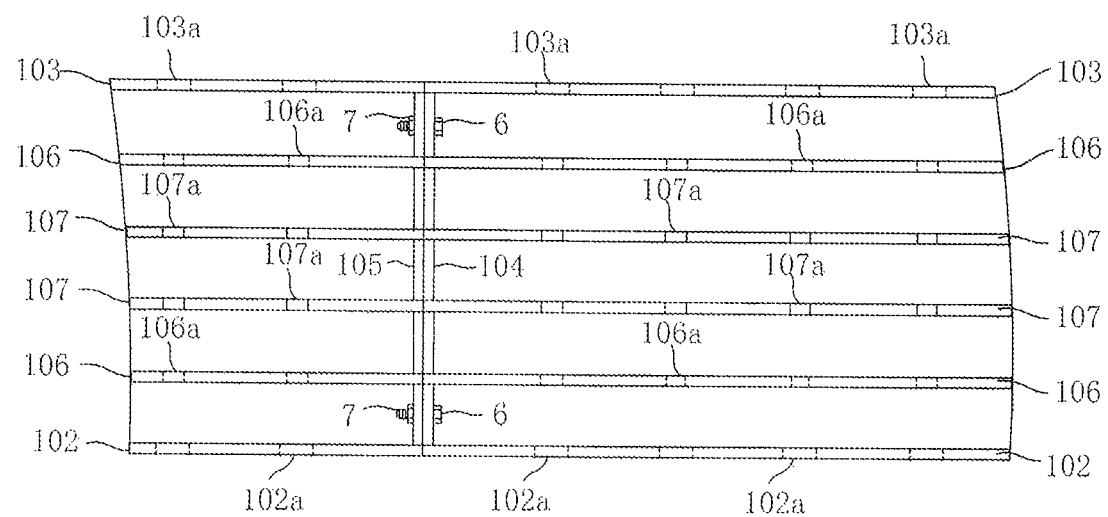
FIG. 2 is a top view showing a state in which two segments are linked in the circumferential direction.

As shown in FIG. 2, the end plate 105 of one segment is brought into contact with the end plate 104 of the other segment, and a bolt 6 and a nut 7 are inserted through operation holes 102b and 103b formed on the side plates 102 and 103. Then, the bolt 6 is screwed into the nut 7 to link the segments in the circumferential direction.

Figure 3:
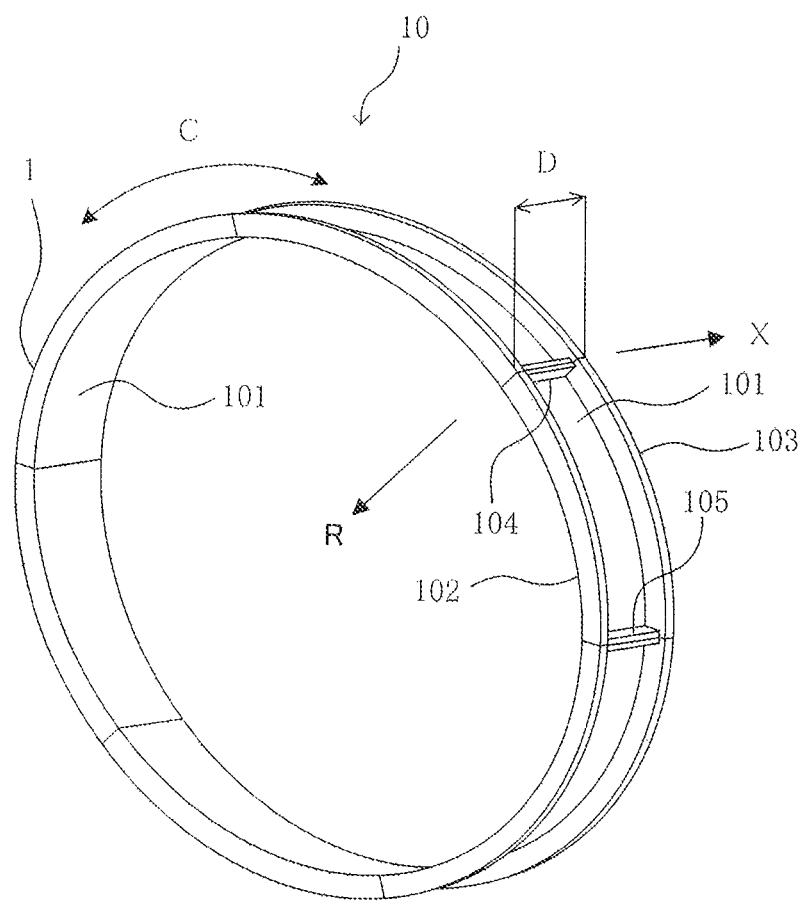
FIG. 3 is a perspective view showing a pipe unit that is assembled by linking the segments in the circumferential direction.

By sequentially linking the segments 1 in the circumferential direction around the full circumference, it is possible to assemble a ring-shaped pipe unit 10 as shown in FIG. 3. The pipe unit 10 has a shape obtained by cutting a round pipe perpendicularly in the longitudinal direction X with a predetermined width D. The outside diameter of the pipe unit is slightly smaller than the inside diameter of an existing pipe to be rehabilitated. The segment corresponds to a member that is obtained when the pipe unit 10 is cut along a radial direction R and divided in the circumferential direction C into a plurality of parts (six equal parts in the present embodiment).

In FIG. 3, the inner surface plate 101, the side plates 102, 103, and the end plates 104, 105, which are the principal structural members of the segment 1, are shown. In order to avoid complexity, reinforcement structures such as the inner plates 106, 107 are not shown.

Figure 4A:
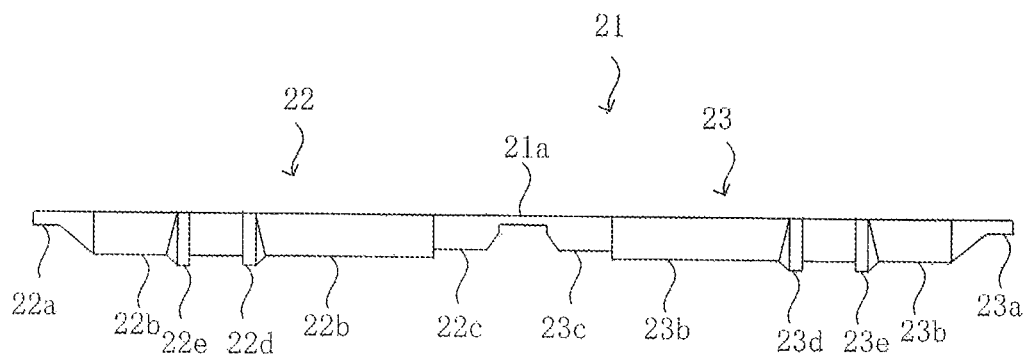
FIG. 4a is a front view of a linking pin in which linking pin halves have been spread apart horizontally.
Figure 4B:
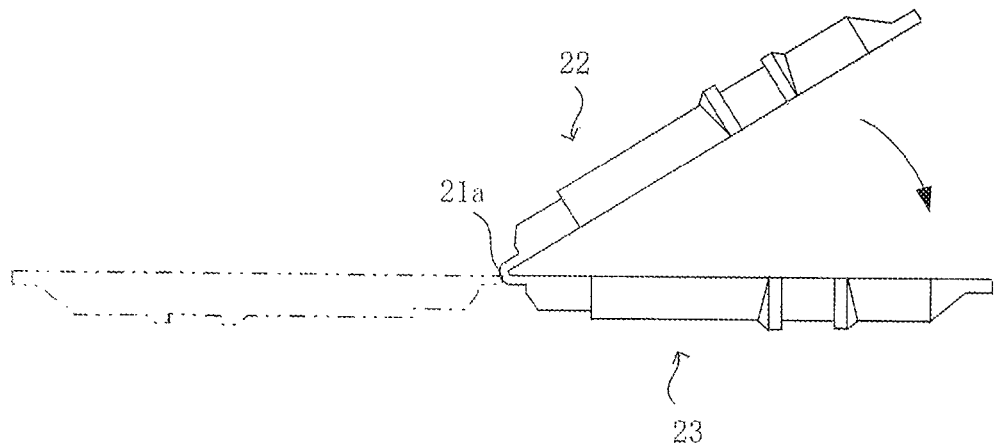
FIG. 4b is a front view of the linking pin showing a process in which the linking pin halves are folded back and overlapped.

FIGS. 4a, 4b, 5a, 5b and 5c show a linking tool for linking the segment 1 or the pipe unit 10 in the longitudinal direction. In the present embodiment, the linking tool is configured as a pin-shaped linking pin 21. As shown in FIG. 4a, the linking pin 21 is an integral member in which linking pin halves 22 and 23 having the same shape are symmetrically connected to each other via a connecting portion 21a. The linking pin 21 is integrally molded of elastic plastic such as polyethylene (PE), polypropylene (PP) and the like.

The linking pin half 22 has a protruding portion 22a, a tubular portion 22b that follows the protruding portion 22a, and a protruding portion 22c that follows the tubular portion 22b. First and second protrusions 22d and 22e are formed on the outer peripheral surface of the tubular portion 22b. The linking pin half 23 has the same shape as the linking pin half 22 and is bilaterally symmetric thereto. The linking pin half 23 has a protruding portion 23a, a tubular portion 23b that follows the protruding portion 23a, and a protruding portion 23c that follows the tubular portion 23b. First and second protrusions 23d and 23e are formed on the outer peripheral surface of the tubular portion 23b.

Figure 5A:
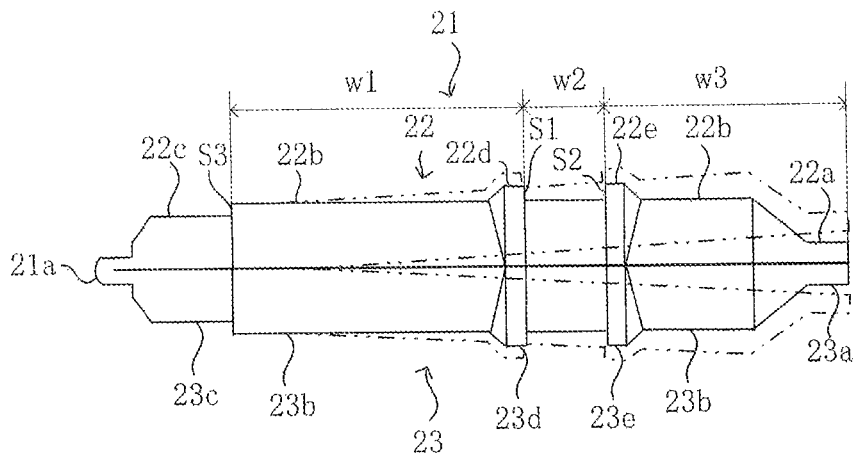
FIG. 5a is a front view of the linking pin when the linking pin halves are overlapped.
Figure 5B:
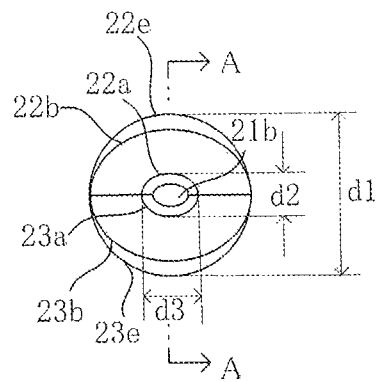
FIG. 5b is a side view of FIG. 5a as viewed from the right side.
Figure 5C:
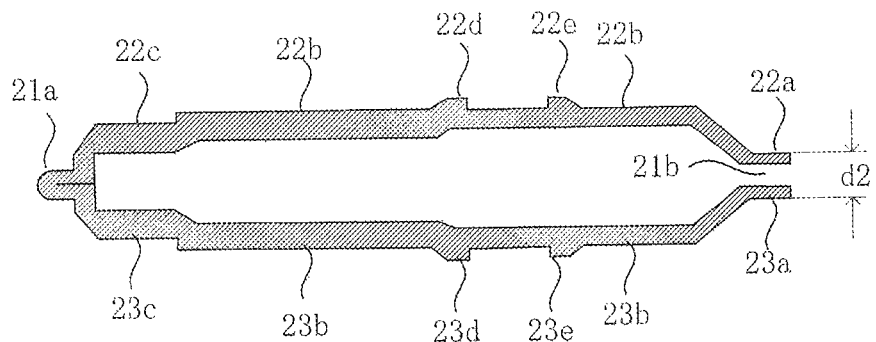
FIG. 5c is a cross-sectional view along the line A-A of FIG. 5b.

When the linking pin halves 22 and 23 are, as shown in FIG. 5a, overlapped with each other, the linking pin 21 is provided with the front protruding portions 22c and 23c, the tubular portions 22b and 23b, and the rear protruding portions 22a and 23a. As shown in FIG. 5b, the tubular linking pin 21 has a slightly flat shape with an elliptical cross section. Since the linking pin 21 has elasticity (spring property), the rear protruding portions 22a, 23a thereof tend to enlarge in diameter as shown by a virtual line in FIG. 5a. Therefore, the rear protruding portions 22a, 23a are pressed by a hand or a jig when the linking pin halves 22 and 23 need to be overlapped with each other.

The front protruding portions 22c and 23c of the linking pin 21 are set to a size that allows them to pass through the insertion hole 106a formed on the inner plate 106 of the segment 1, and the tubular portions 22b and 23b thereof are set to a size that doesn't allow them to pass therethrough. The first protrusions 22d, 23d and the second protrusions 22e, 23e formed on the outer peripheral surfaces of the tubular portions 22b, 23b have the same shape and project radially therefrom. As shown in FIG. 5b, the first and second protrusions form a circular shape having a diameter d1 that is the same as or slightly smaller than the diameter of the insertion holes 102a, 103a of the side plates 102, 103 of the segment 1, thus having a size that allows them to pass through the insertion holes 102a, 103a thereof.

As will be described later, the first protrusions 22d and 23d of the linking pin 21 have a surface that contacts the side plate of the segment and forms a vertical surface S1 when it is attached to the segment, while having the other surface that is inclined and continuous with the tubular portions. A distance w1 between the vertical surface S1 of the tubular portions and the end surface S3 thereof on the side of the front protruding portions is equal to a distance t1 between the side plate 102 (103) of the segment 1 and the inner plate 106 adjacent thereto. The second protrusions 22e and 23e also have a surface that contacts the side plate and forms a vertical surface S2 with the other surface inclined and continuous with the tubular portions. A distance w3 between the vertical surface S2 and the final end of the rear protruding portions 22a and 23a is shorter than the distance t1 between the side plate 102 (103) of the segment 1 and the inner plate 106 adjacent thereto. The vertical surfaces S1 and S2 of the first protrusions 22d and 23d and the second protrusions 22e and 23e face each other, and a distance w2 between the vertical surfaces S1 and S2 is equal to twice the thickness t2 of the side plate 102(103), having a space that allows the two side plates to be tightly fitted therebetween.

The rear protruding portions 22a and 23a of the linking pin 21 have an elliptical cross section with a hole 21b formed therein, and the outer circumference thereof has a vertical distance d2 and a horizontal distance d3. When the linking pin 21 is, as described later, enlarged in diameter to link the segments, the distances d2 and d3 are set to be smaller than the diameter of the insertion hole 106a of the inner plate 106.

Next, a method will be described in which the segments are linked in the longitudinal direction using the linking pin 21 configured as described above.

Figure 6:
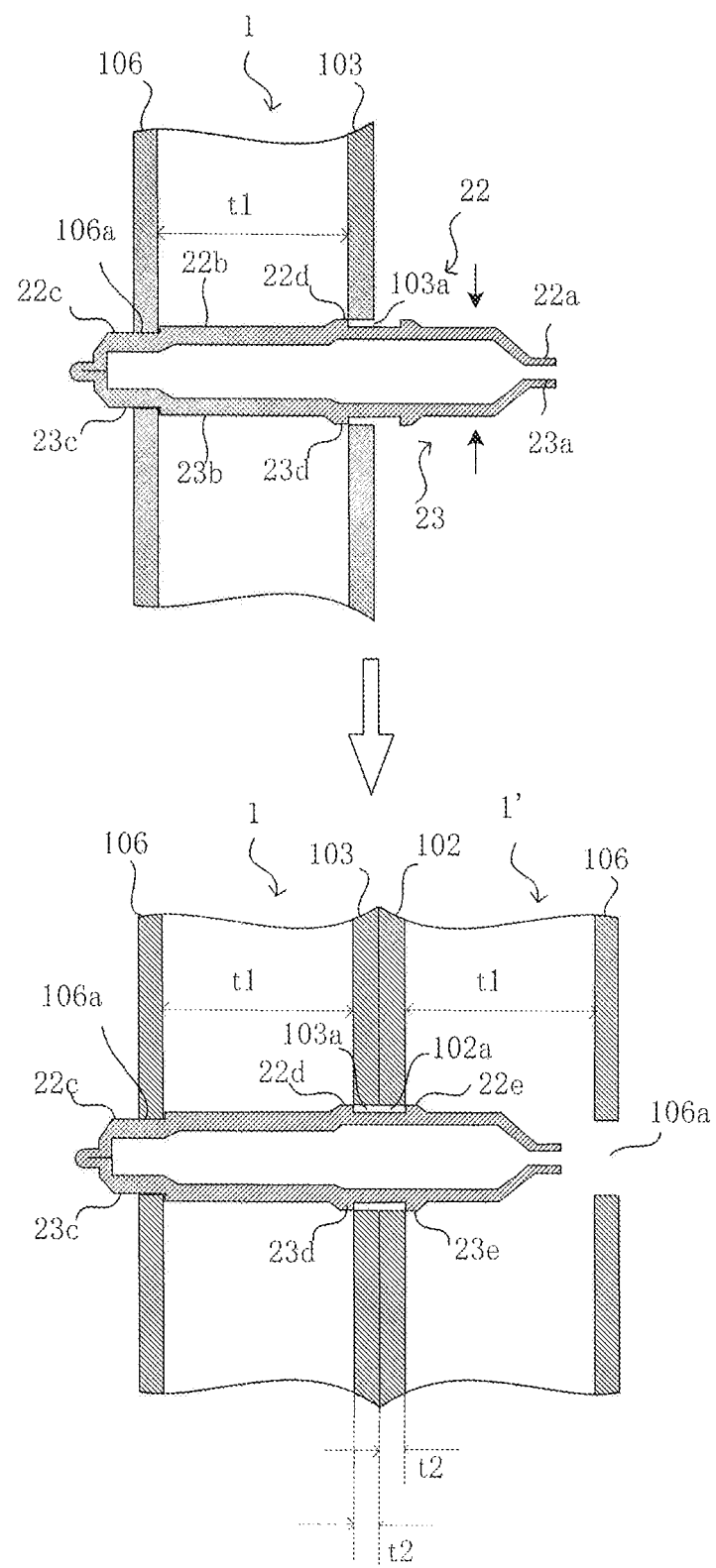
FIG. 6 is a cross-sectional view showing a process in which the linking pin is attached to the segments.

As shown in the upper part of FIG. 6, the linking pin halves 22 and 23 are overlapped with each other and the linking pin 21 is inserted into the insertion hole 103a of the side plate 103 of the segment 1 and the insertion hole 106a of the inner plate 106 thereof. The front protruding portions 22c and 23c of the linking pin 21 pass through the insertion hole 106a, but the tubular portions 22b and 23b cannot pass therethrough, so that the linking pin 21 is held at the position shown in the figure.

In this state, the distance w1 between the vertical surface S1 of the first protrusions 22d and 23d and the end surface S3 of the tubular portions on the side of the front protruding portions 22c, 23c is equal to the distance t1 between the side plate 103 and the inner plate 106 adjacent thereto. Therefore, the vertical surfaces S1 of the first protrusions 22d and 23d is substantially flush with the inner surface of the side plate 103. Since the linking pin 21 is made of elastic plastic, the linking pin halves 22 and 23 are elastically enlarged in diameter as shown by the phantom line in FIG. 5a. In order to keep the linking pin halves 22 and 23 in the overlapped state, the rear protruding portions 22a, 23a are pressed by hand or with a jig.

As shown in the lower part of FIG. 6, the linking pin 21 is then inserted into the insertion hole 102a of the side plate 102 of the segment 1' to be linked to the segment 1. Since the surfaces of the second protrusions 22e and 23e on the side opposite to the vertical surface S2 are inclined, the linking pin 21 can be smoothly inserted into the segment 1' even if the linking pin 21 is enlarged in diameter due to elasticity. Assuming that each plate thickness is t2, both plate thickness 2×t2 is equal to the distance w2 between the vertical surfaces S1 and S2 of the first and second protrusions, so that the linking pin 21 lies in the position as shown in the lower part of FIG. 6 when the side plates 103 and 102 of the segments 1 and 1' are made in contact with each other.

Figure 7:
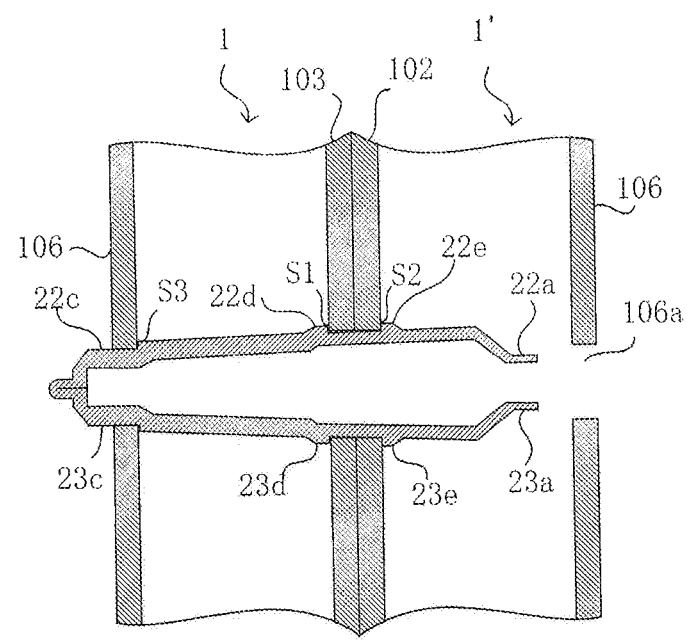
FIG. 7 is a cross-sectional view showing a state in which the linking pin enlarges in diameter to link the segments in the longitudinal direction.

At this position, the linking pin 21 elastically enlarges in diameter and the side plates 103 and 102 of both the segments 1 and 1' are fitted between the first and second protrusions without separating the connecting portion 21a of the linking pin 21, as shown in FIG. 7. The distance w2 between the vertical surfaces S1 and S2 of the first and second protrusions that face each other is equal to twice the plate thickness of the side plate 102 (103). Therefore, the side plate 102 of the segment 1' and the side plate 103 of the segment 1 are pressed and fixed between both vertical surfaces S1 and S2, so that both the segments 1 and 1' can be firmly linked in the longitudinal direction.

In the present embodiment, both the segments can be easily unlinked by reducing the diameter of the linking pin. An unlinking rod 30 as shown in FIG. 9 is used to unlink the segments.

Figure 9:
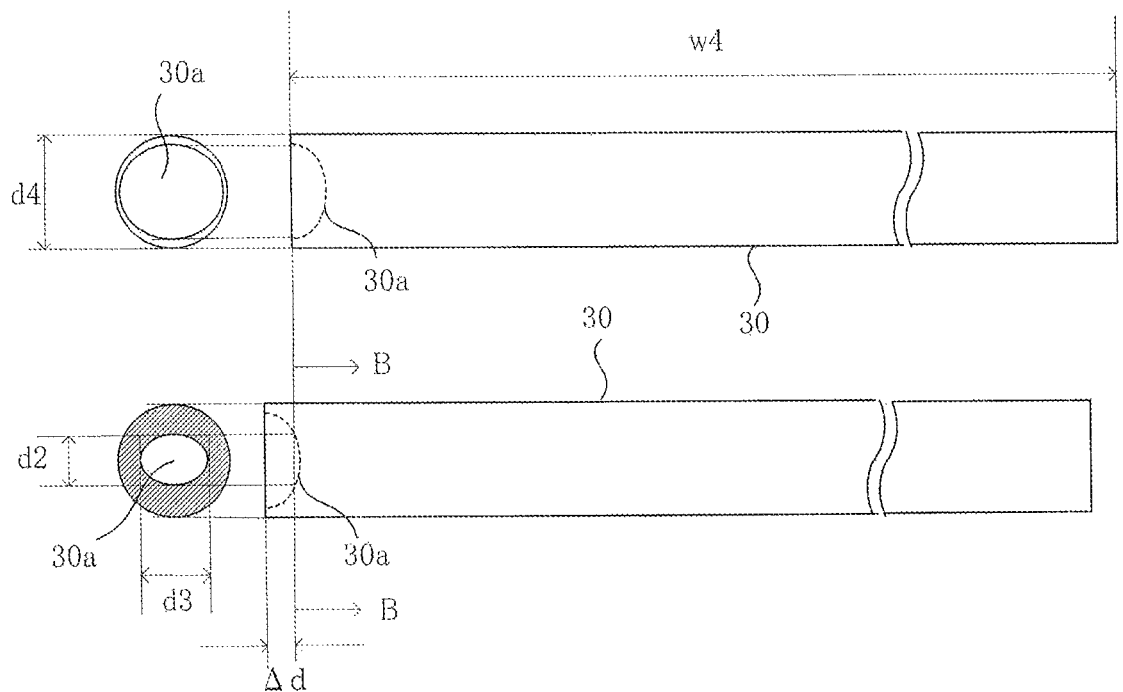
FIG. 9 is an illustrative view showing the structure of a rod for unlinking the segments.

The upper part of FIG. 9 shows the unlinking rod 30 and its left side surface, and the lower part thereof shows the unlinking rod 30 and its cross-section along the line B-B. The unlinking rod 30 has a length w4 longer than the length of the segment 1 in the longitudinal direction and is large enough to pass through the insertion hole 106a of the inner plate 106. The unlinking rod 30 has a portion 30a curved inward at one end thereof.

The unkinking rod 30 has a circular cross section with a diameter d4 and the curved portion 30a has an elliptical cross section. As shown in the upper part of FIG. 8, the curved portion 30a of the unlinking rod 30 has at its tip surface a size that corresponds to the size of the rear protruding portions 22a, 23a that are obtained when the linking pin 21 is enlarged in diameter to link two segments. The curved portion 30a becomes smaller in elliptical cross section as it becomes deeper. When the unlinking rod 30 moves, for example, by Δd into the line B-B, the curved portion 30a has a cross-sectional shape that corresponds to the elliptical shape of the rear protruding portions 22a and 23a having the short diameter d2 and the long diameter d3 that are obtained when the unlinking pin halves 22, 23 are overlapped as shown in FIGS. 5b and 6.

Figure 8:
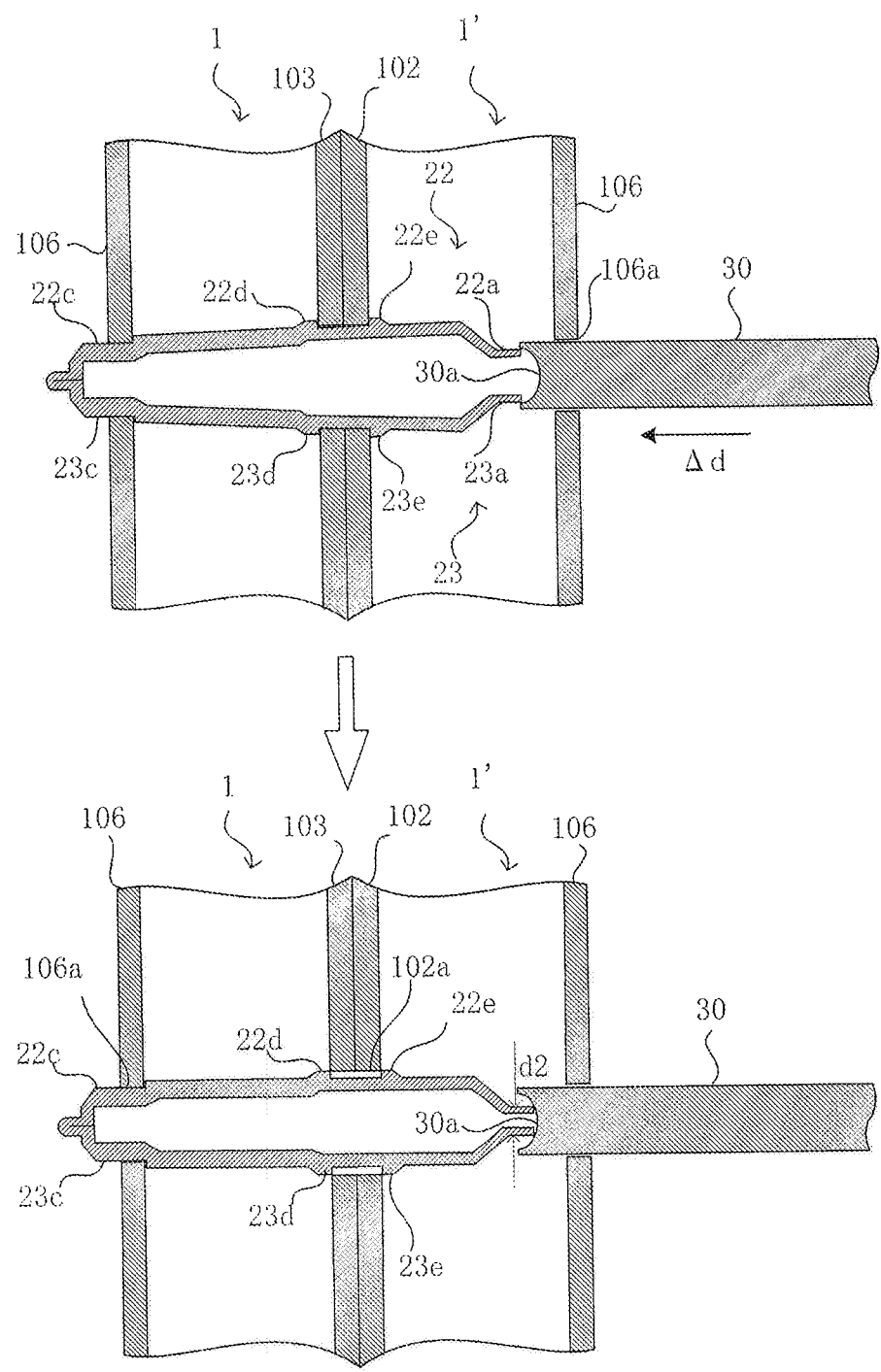
FIG. 8 is a cross-sectional view showing a process in which the segments are unlinked.

FIG. 8 shows a state in which the unlinking rod 30 is used to unlink the segments 1, 1'. As shown in the upper part of FIG. 8, the unlinking rod 30 is inserted into the insertion hole 106a of the inner plate 106 of the segment 1' so that the rear protruding portions 22a and 23a of the enlarged linking pin 21 can enter the curved portion 30a of the unlinking rod 30. When the unlinking rod 30 is moved by Δd as shown in the lower part of FIG. 8, the rear protruding portions 22a and 23a are reduced in diameter against elasticity to a size in which the linking pin halves 22 and 23 are overlapped with each other as shown in FIGS. 5b and 6. In this state, the second protrusions 22e and 23e can pass through the insertion hole 102a of the side plate 102 of the segment 1', so that the segment 1' can be pulled out from the linking pin 21 to unlink the two segments.

Figure 10A:
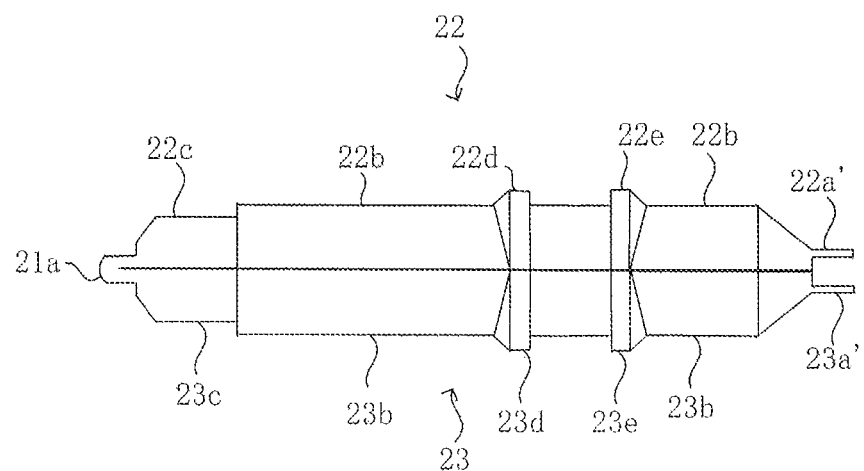
FIG. 10a is a front view showing another embodiment of the linking pin.
Figure 10B:
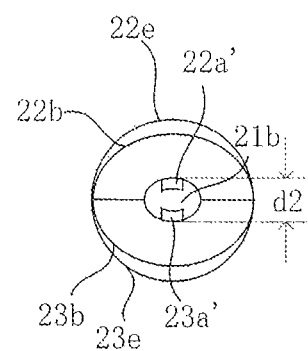
FIG. 10b is a side view of FIG. 10a as viewed from the right side.

As shown in FIGS. 10a and 10b, the rear protruding portions 22a' and 23a' may be formed only partially at positions facing each other in the vertical direction (shorter diameter direction). Then, the rear protruding portions 22a' and 23a' can be substantially arc-shaped in outer periphery even when the linking pin halves are overlapped or enlarged in diameter. This allows an unlinking rod to be produced which has a circular cross-sectional curved portion, thereby making it possible to reduce the manufacturing cost.

As shown in FIG. 1, the insertion holes through which the linking tools can pass are formed along the circumferential direction of the side plate and the inner plate of the segment. The linking pin 21 is inserted into a predetermined number of the insertion holes among them to link the segments in the longitudinal direction. However, the link strength is weak because the linking pin 21 is short. Therefore, the method as described in Patent Document 1 is employed in which the segments are firmly connected in the longitudinal direction via a long linking tool. This is shown in FIG. 11.

Figure 11:
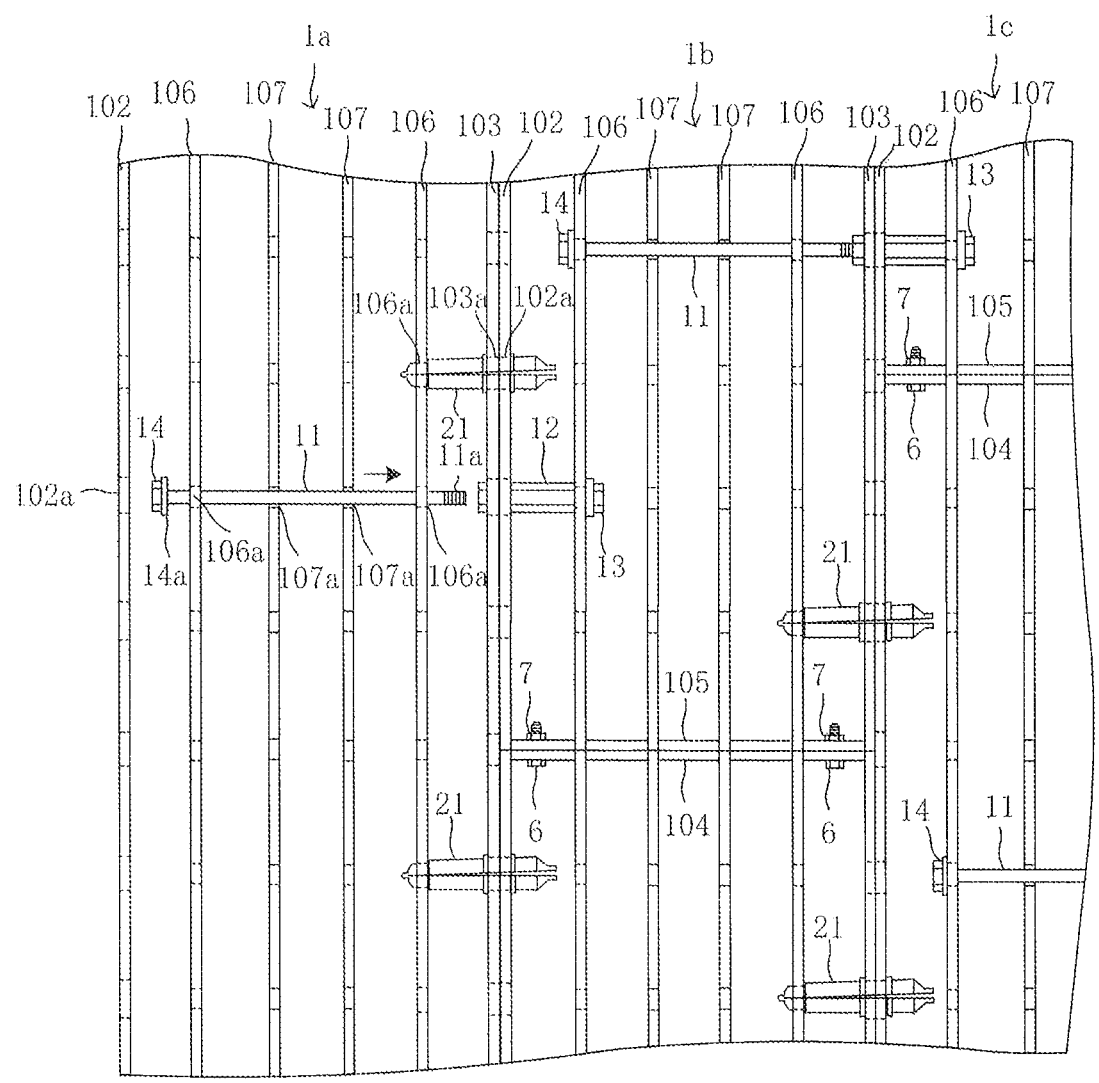
FIG. 11 is a top view showing a state in which the segments are linked in the longitudinal direction.

In FIG. 11, the segments 1a, 1b, 1c are partially connected using the above-described linking pin 21. On the other hand, nuts 12 are attached to one segment and long bolts 11 are screwed into the nuts 12 from the other segment to link both the segments. At locations where strength is required, the long bolts are used to link the segments while the linking pins 21 are used to further reinforce the strength. This allows a strong rehabilitation pipe to be constructed.

Figure 12:
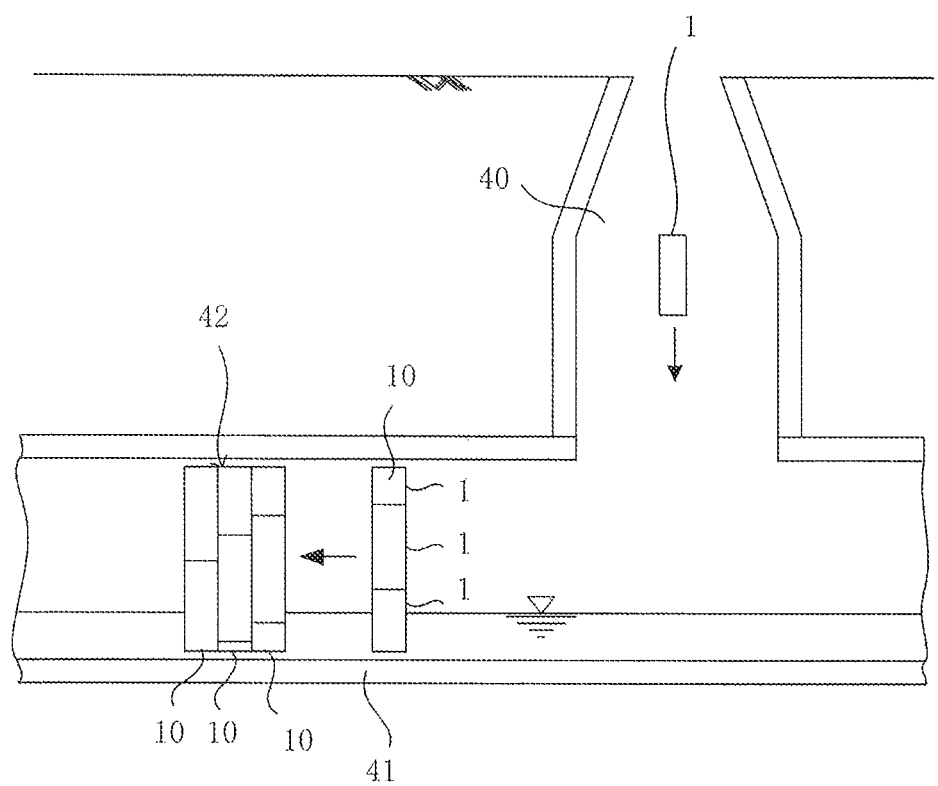
FIG. 12 is an illustrative view showing a state in which a rehabilitating pipe is installed inside an existing pipe using the segments.

As shown in FIG. 12, the segments 1 are carried into an existing pipe 41 through a manhole 40 and sequentially linked in the circumferential direction to assemble the pipe unit 10. The thus assembled pipe unit 10 is then linked in the longitudinal direction to the pipe unit 10 which has already been assembled, thereby installing a rehabilitation pipe 42 inside the existing pipe 41. The above-described linking pin and the long bolt are used to link the pipe units. When the rehabilitation pipe 42 has been assembled a predetermined length, a filler is filled between the outer periphery of the rehabilitation pipe 42 and the inner wall surface of the existing pipe 41 to provide a rehabilitation pipe integrated with the existing pipe.

KEY TO THE SYMBOLS 1 segment
10 pipe unit
21 linking pin
22a, 23a rear protruding portion
22b, 23b tubular portion
22c, 23c front protruding portion
22d, 23d first protrusion
22e, 23e second protrusion
30 unlinking pin
41 existing pipe
42 rehabilitation pipe

The invention claimed is:

1. A method for linking a plurality of segments in a longitudinal direction to assemble a rehabilitation pipe, each segment being formed by integrally molding an inner surface plate constituting an inner circumferential surface, side plates that have insertion holes and are provided upright on both sides extending in the circumferential direction of the inner surface plate, and inner plates between the side plates having insertion holes each smaller in diameter than those of the side plates, comprising:

preparing a linking pin made of elastic plastic having linking pin halves symmetrically connected via a connecting portion and capable of being folded back and overlapped with each other, the linking pin being, when the linking pin halves are overlapped, provided with a front protruding portion capable of passing through the insertion hole of the inner plate of a respective segment, a tubular portion having on its outer periphery surface first and second protrusions that are separated by a distance of twice a thickness of the side plate of the respective segment and can pass through the insertion hole of the side plate, and a rear protruding portion that enlarges in diameter due to elasticity;

inserting the front protruding portion of the linking pin into the insertion hole of the inner plate of one segment and the tubular portion into the insertion hole of the side plate of the one segment;

inserting the tubular portion of the linking pin into the other segment to position the side plates of the one and the other segments between the first and second protrusions of the tubular portion; and enlarging the linking pin in diameter due to elasticity to fit the side plates of the one and the other segments between the first and second protrusions, thereby linking the one and the other segments in the longitudinal direction without separating the connecting portion of the linking pin, wherein the linking pin that is enlarged in diameter is reduced in diameter to unlink the one and the other segments that are fixed between the first and second protrusions of the linking pin, and wherein an unlinking rod is used to reduce the diameter of the rear protruding portion of the linking pin and unlink the one and the other segments.

2. A method according to claim 1, wherein the linking pin is inserted into a predetermined number of insertion holes of the side plate and the inner plate to link the one and the other segments in the longitudinal direction.

3. A linking tool for linking a plurality of segments in a longitudinal direction to assemble a rehabilitation pipe, each segment being formed by integrally molding an inner surface plate constituting an inner circumferential surface, side plates that have insertion holes and are provided upright on both sides extending in the circumferential direction of the inner surface plate, and inner plates between the side plates having insertion holes each smaller in diameter than those of the side plates, wherein the linking tool is configured as a linking pin made of elastic plastic having linking pin halves symmetrically connected via a connecting portion and capable of being folded back and overlapped with each other;

the linking pin is, when the linking pin halves are overlapped, provided with a front protruding portion capable of passing through the insertion hole of the inner plate of a respective segment, a tubular portion having on its outer periphery surface first and second protrusions that are separated by a distance of twice a thickness of the side plate of the respective segment and can pass through the insertion hole of the side plate, and a rear protruding portion that enlarges in diameter due to elasticity; and the linking pin is configured such that it is enlarged in diameter due to elasticity to fit the side plates of one segment and the other segment between the first and second protrusions and link the one and the other segments in the longitudinal direction without separating the connecting portion of the linking pin and such that it is reduced in diameter to unlink the one and the other segments, wherein the rear protruding portion of the linking pin is configured to receive an application of an unlinking rod to reduce the diameter of the rear protruding portion of the linking pin and unlock the one and the other segments that are fixed between the first and second protrusions of the linking pin.

4. A linking tool according to claim 3, wherein the rear protruding portion of the linking pin is smaller than the insertion hole of the inner plate.

5. A linking tool according to claim 3, wherein the first and second protrusions have a vertical surface that abuts against the side plate.

6. A linking tool according to claim 3, wherein the rear protruding portion of the linking pin is formed in a shape such that an outer circumference thereof becomes an arc even when the linking pin is reduced or enlarged in diameter.

* * * * *